Figure 1:
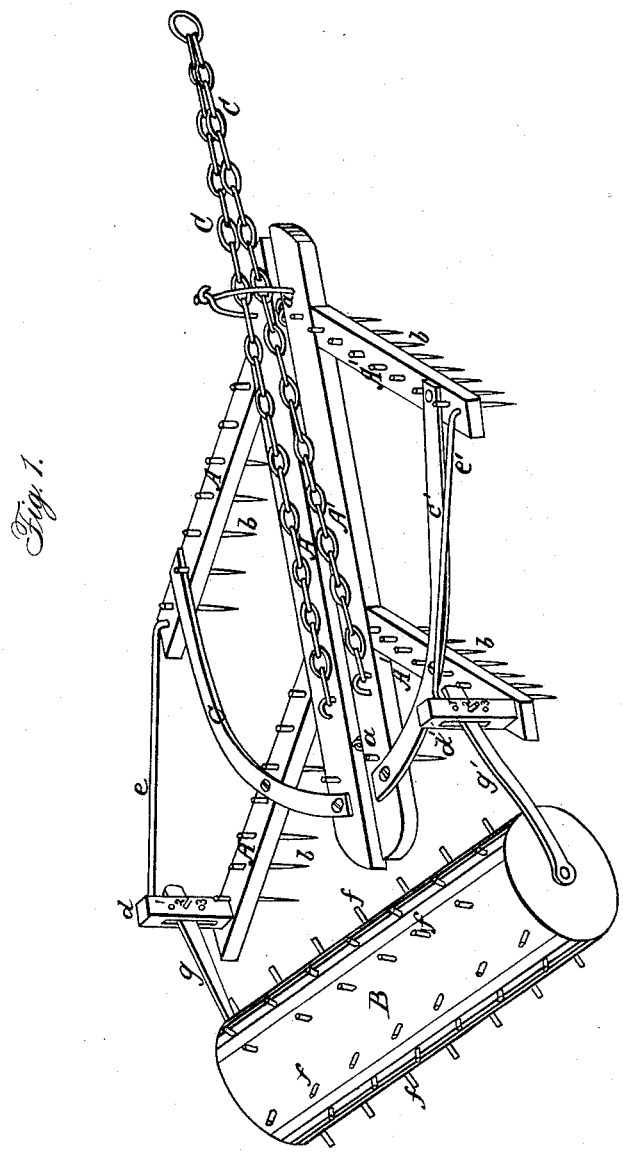

S. W. HAMSHER.

Revolving Harrow.

No. 25,824.

Patented Oct. 18, 1859.

Witnesses:
Thos. H. Upperman
C. Cohen

Inventor:
Samuel W. Hamsher

UNITED STATES PATENT OFFICE.

SAMUEL W. HAMSHER, OF DECATUR, ILLINOIS.

IMPROVEMENT IN HARROWS.

Specification forming part of Letters Patent No. 25,824, dated October 18, 1859.

*To all whom it may concern:*

Be it known that I, SAMUEL W. HAMSHER, of Decatur, in the county of Macon and State of Illinois, have invented a certain new and useful Improvement in Harrows; and I do hereby declare the following to be a full, clear, and exact description of the construction and operation of the same, reference being had to the accompanying drawing, making a part of this specification, in which—

The figure represents a perspective view of the harrow complete.

I am aware that many forms of harrows with toothed rollers attached have been made, and that the rollers have been hinged to the harrow-frames by arms on which it can rise and fall. I am, moreover, aware that a roller has been so combined with a harrow-frame as that more or less of its weight may be thrown upon or removed from the harrow; but in this latter case the arrangement was so contrived that the roller must carry the harrow, and thus prevent its teeth from penetrating the ground, the adjustment, when made, being rigid.

The nature of my invention consists in a certain arrangement of the parts whereby the roller and harrow may be so adjusted as that the roller is the means of defining the extent of penetration of the frame-teeth, while either may rise and fall to accommodate itself to the inequalities of the surface over which it passes without influencing the other.

To enable others skilled in the art to make and use my invention, I will proceed to describe the same with reference to the drawing.

A and A' represent two harrow-frames, hinged together at the points *a a.* These harrow-frames are furnished with any suitable number of teeth, *b b,* so disposed as to break up the soil in the line of its path. The longitudinal and lateral pieces of these frames may be braced together by the curved pieces *c c'* to give the necessary strength and rigidity. In the rear lateral pieces of the frames are fixed respectively the standards *d d',* in which are slots or their equivalents and adjusting-holes 1 2 3, &c., and these standards may be further braced by the rods *e e'* extending from them to the front lateral pieces of said frame.

B is a toothed roller, its teeth *f* being shorter than those of the harrow-frames. It is furnished with journals at its two ends, which can turn in the ends respectively of the arms *g g',* the other ends of said arms being pivoted to the standards *d d'* at such proper height as the nature of the soil may require.

C are the drag-chains by which the harrow is drawn over the ground.

By jointing the harrow-frames longitudinally the two sections can accommodate themselves to any inequalities of the ground over which they pass, and by making the roller in one piece or in more pieces, but on one shaft, it levels down, as well as completes the thorough pulverization of the soil. By my manner of hanging the roller to the harrow-frames by pivoted adjustable arms I gain the following decided advantage over any other combined roller and frame-harrow of which I have knowledge, viz: that by raising the arms in the standards I can make the teeth of the frames penetrate farther into the soil, or by lowering them in the standards allow the teeth less penetration; but in doing this I do not alter the working of the roller itself, for it is constant in its action, whatever the frames may be adjusted for, whether deep or shallow work. This cannot be done by hinged arms simply. They must have an adjusting property to effect this object; nor could it be done where the journals of the roller are in bearings on the harrow-frame, for then one must ride on or be influenced by the other. In my case the roller may regulate the harrow-frames; but the harrow-frames do not effect the working of the roller, its duty, except in being drawn by the frames, being independent of them; and I thus make a very cheap, efficient, durable, and highly-valuable agricultural implement, and one highly prized by those who have used it.

Having thus fully described the nature and object of my invention, what I claim therein as new, and desire to secure by Letters Patent, is—

The arrangement of the harrow-frames, toothed roller, and hinged adjustable arms, as herein set forth and explained, and for the purpose stated.

SAMUEL W. HAMSHER.

Witnesses:
THOMAS H. UPPERMAN,
E. COHEN.